United States Patent
Ariyoshi et al.

(10) Patent No.: US 10,992,731 B2
(45) Date of Patent: Apr. 27, 2021

(54) GROUND DEVICE AND GROUND-ONBOARD COMMUNICATION SYSTEM

(71) Applicant: Mitsubishi Electric Corporation, Tokyo (JP)

(72) Inventors: Goichi Ariyoshi, Tokyo (JP); Yoshiko Kawamura, Tokyo (JP); Hiromi Goda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/495,533

(22) PCT Filed: Mar. 27, 2017

(86) PCT No.: PCT/JP2017/012411
§ 371 (c)(1),
(2) Date: Sep. 19, 2019

(87) PCT Pub. No.: WO2018/179057
PCT Pub. Date: Oct. 4, 2018

(65) Prior Publication Data
US 2020/0021637 A1 Jan. 16, 2020

(51) Int. Cl.
*G06F 15/173* (2006.01)
*H04L 29/08* (2006.01)
*G07C 5/00* (2006.01)

(52) U.S. Cl.
CPC .............. *H04L 67/06* (2013.01); *G07C 5/008* (2013.01)

(58) Field of Classification Search
CPC ................................ H04L 67/06; G07C 5/008
(Continued)

(56) References Cited

U.S. PATENT DOCUMENTS

| 2006/0149463 A1* | 7/2006 | Machii | G08G 1/202 |
| | | | 701/533 |
| 2012/0094606 A1* | 4/2012 | Sakata | H04W 4/06 |
| | | | 455/66.1 |

FOREIGN PATENT DOCUMENTS

| JP | 2002055870 A | 2/2002 |
| JP | 2009017634 A | 1/2009 |
| JP | 2011170667 A | 9/2011 |

OTHER PUBLICATIONS

International Search Report (with English translation) and Written Opinion issued in corresponding International Patent Application No. PCT/JP2017/012411, 6 pages (dated Jun. 13, 2017).

* cited by examiner

*Primary Examiner* — Wing F Chan
*Assistant Examiner* — Joseph R Maniwang
(74) *Attorney, Agent, or Firm* — Buchanan Ingersoll & Rooney PC (57) ABSTRACT

An object is to obtain a ground device capable of reducing a communication time of train information from an onboard device to the ground device. A ground device, which is capable of communicating with an onboard device and acquiring unreceived data from the onboard device by difference downloading or batch downloading, includes a difference-communication determiner to determine whether to acquire the unreceived data from the onboard device by difference downloading or to acquire all data to be acquired from the onboard device including the unreceived data by batch downloading. The difference-communication determiner includes a communication-time evaluator to evaluate a total communication time when data in a specified period is acquired by the batch downloading and that by the difference downloading, and a communication switch to (Continued)

output a download instruction based on a result of evaluation by the communication-time evaluator.

8 Claims, 5 Drawing Sheets

(58) Field of Classification Search
USPC .......................................................... 709/236
See application file for complete search history.

GROUND DEVICE AND GROUND-ONBOARD COMMUNICATION SYSTEM

FIELD

The present invention relates to: a ground device that communicates with an onboard device; and a ground-onboard communication system including an onboard device and a ground device.

BACKGROUND

Time-series recorded data that is related to a train state recorded in an onboard device is required to be acquirable from a plurality of vehicles by a plurality of ground operators, where the recorded data is used for analysis, prediction, and report of a failure. However, when data is acquired every time such a request specifying a period is received from a ground device, it takes a long time to complete data acquisition. Particularly, in a country or a region where the quality of wireless communication is low, it takes a very long time to complete data acquisition.

Meanwhile, Patent Literature 1 that is an example of conventional techniques discloses a technique of "reducing the amount of data to be transmitted by comparing the amount of difference data and the amount of latest data with each other and by transmitting the data having a smaller amount as a response", because "there is a case where the amount of difference data becomes larger than the amount of latest data when many changes have been made to the data and the amount of changes is large".

CITATION LIST

Patent Literature

Japanese Patent Application Laid-open No. 2002-55870

SUMMARY

Technical Problem

However, although the conventional technique described above reduces the amount of data to be transmitted, it still has problems that, in a case where plural pieces of difference data are located in different periods, the communication time is long and communication is frequent.

The present invention has been achieved in view of the above problems, and an object of the present invention is to provide a ground device that can reduce a time of communication of train information from an onboard device to the ground device.

Solution to Problem

To solve the above problems and achieve the object a ground device capable of communicating with an onboard device and acquiring unreceived data from the onboard device by difference downloading or batch downloading, the ground device includes a difference-communication determiner to determine whether: to acquire the unreceived data from the onboard device by difference downloading; or to acquire all data to be acquired from the onboard device including the unreceived data by batch downloading. The difference-communication determiner includes: a communication-time evaluator to evaluate a total communication time when data in a specified period is acquired by the batch downloading and that by the difference downloading; and a communication switch to output a download instruction based on a result of evaluation by the communication-time evaluator.

Advantageous Effects of Invention

According to the present invention, there is an effect where it is possible to reduce a time of communication of train information sent from an onboard device to a ground device.

DESCRIPTION OF EMBODIMENTS

A ground device and a ground-onboard communication system according to an embodiment of the present invention will be described below in detail with reference to the accompanying drawings. The present invention is not limited to the embodiment.

Embodiment

Figure 1:
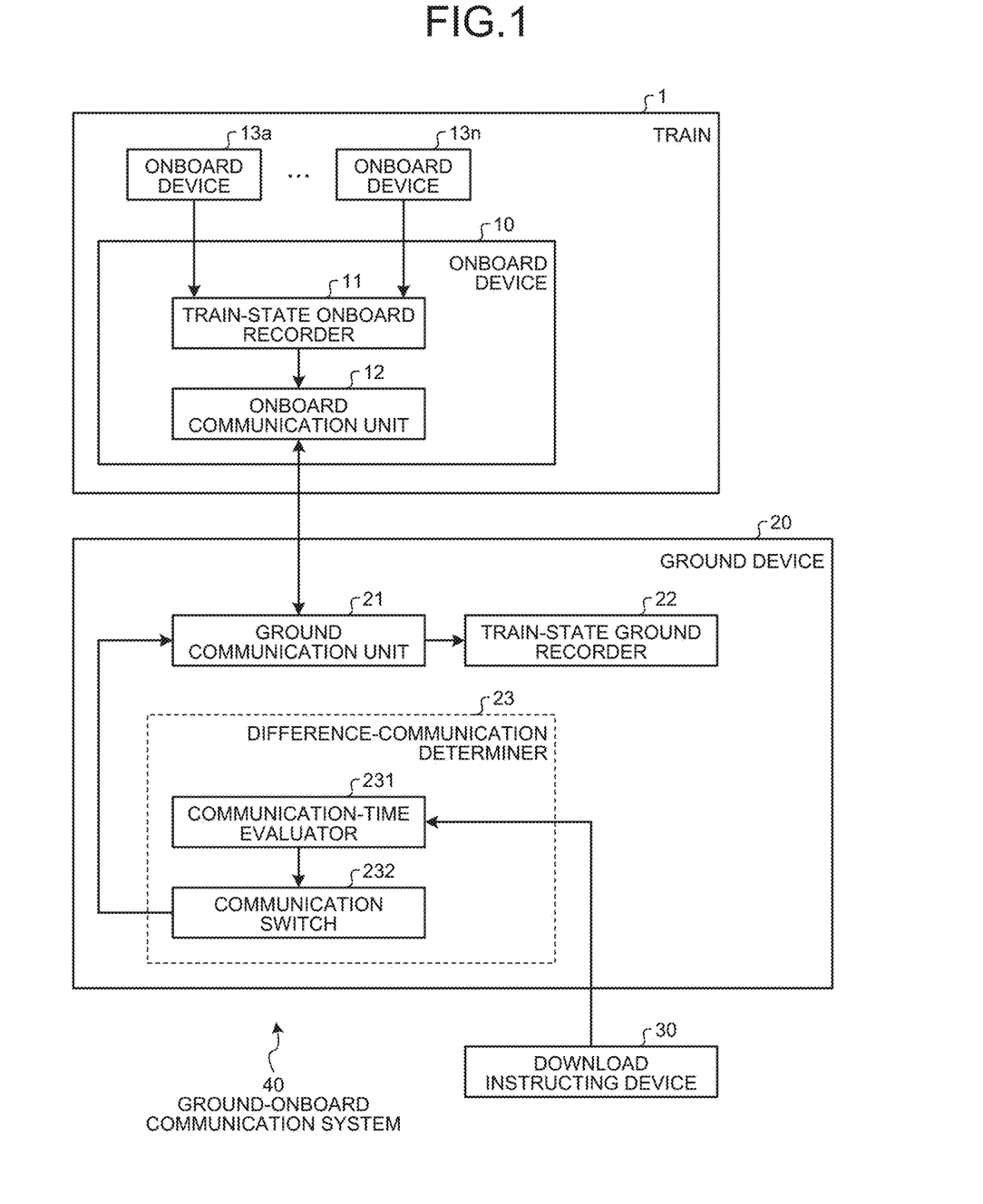
FIG. 1 is a block diagram illustrating a configuration example of a ground-onboard communication system including a ground device according to an embodiment.

FIG. 1 is a block diagram illustrating a configuration example of a ground-onboard communication system including a ground device according to an embodiment of the present invention. A ground-onboard communication system 40 illustrated in FIG. 1 includes an onboard device 10 incorporated in a train 1 and a ground device 20 provided on a ground side. The train 1 includes a plurality of onboard devices. In this example, onboard devices 13a and 13n are illustrated as examples of the onboard devices and these are collectively described as a plurality of onboard devices 13i. Examples of the onboard devices 13i include control devices for a door, a brake, an accelerator, and an air conditioner. Further, there is also a case where an onboard monitor device that includes an onboard device relays communication with the ground device 20.

The onboard device 10 includes a train-state onboard recorder 11 and an onboard communication unit 12. The train-state onboard recorder 11 records therein device-state information acquired from the onboard devices 13i as train information in time series. In this example, the device-state information is information that indicates a state of each of the onboard devices 13i and includes at least information in which a record of a change of the state of each of the onboard devices 13i, a telemeter value and input/output signals, and input/output values is stored in the form of history on a time axis. Examples of the device-state information include door opening/closing-state information, brake input/output-signal record information, accelerator input/output-signal record information, notch state information, train speed information, train acceleration information, air-conditioner set-temperature information, and cabin measured-temperature information. The device-state information of all the onboard devices 13*i* is collectively referred to as "train information". In the train information, time-series states at the time of recording in the train-state onboard recorder 11 are maintained.

The onboard communication unit 12 acquires train information from the train-state onboard recorder 11 and transmits the train information to a ground communication unit 21. Transmission of the train information from the onboard communication unit 12 to the ground communication unit 21 is performed in response to a request from the ground communication unit 21.

The ground device 20 includes the ground communication unit 21, a train-state ground recorder 22, and a difference-communication determiner 23. The ground communication unit 21: transmits a request of train information to the onboard communication unit 12; receives train information from the onboard communication unit 12; and outputs the received train information to the train-state ground recorder 22. The train-state ground recorder 22 records therein the train information acquired from the ground communication unit 21.

The difference-communication determiner 23 includes a communication-time evaluator 231 and a communication switch 232. The communication-time evaluator 231 refers to time-series states of train information recorded in the train-state ground recorder 22, in a period requested from a download instructing device 30 which is specified by an operator, that is, in a specified period, and the communication-time evaluator 231 evaluates the communication-time and outputs total-communication-time evaluation information that is a result of this evaluation to the communication switch 232. The total-communication-time evaluation information is information that indicates whether a total communication time is shorter in a case of batch downloading or in a case of difference downloading, or information that indicates whether a total communication time is longer in a case of batch downloading or in a case of difference downloading. The communication switch 232 outputs a download instruction based on the total-communication-time evaluation information acquired from the communication-time evaluator 231. The ground communication unit 21 to which this download instruction has been input transmits a download instruction to the onboard communication unit 12 in accordance with this input download instruction.

Figure 2:
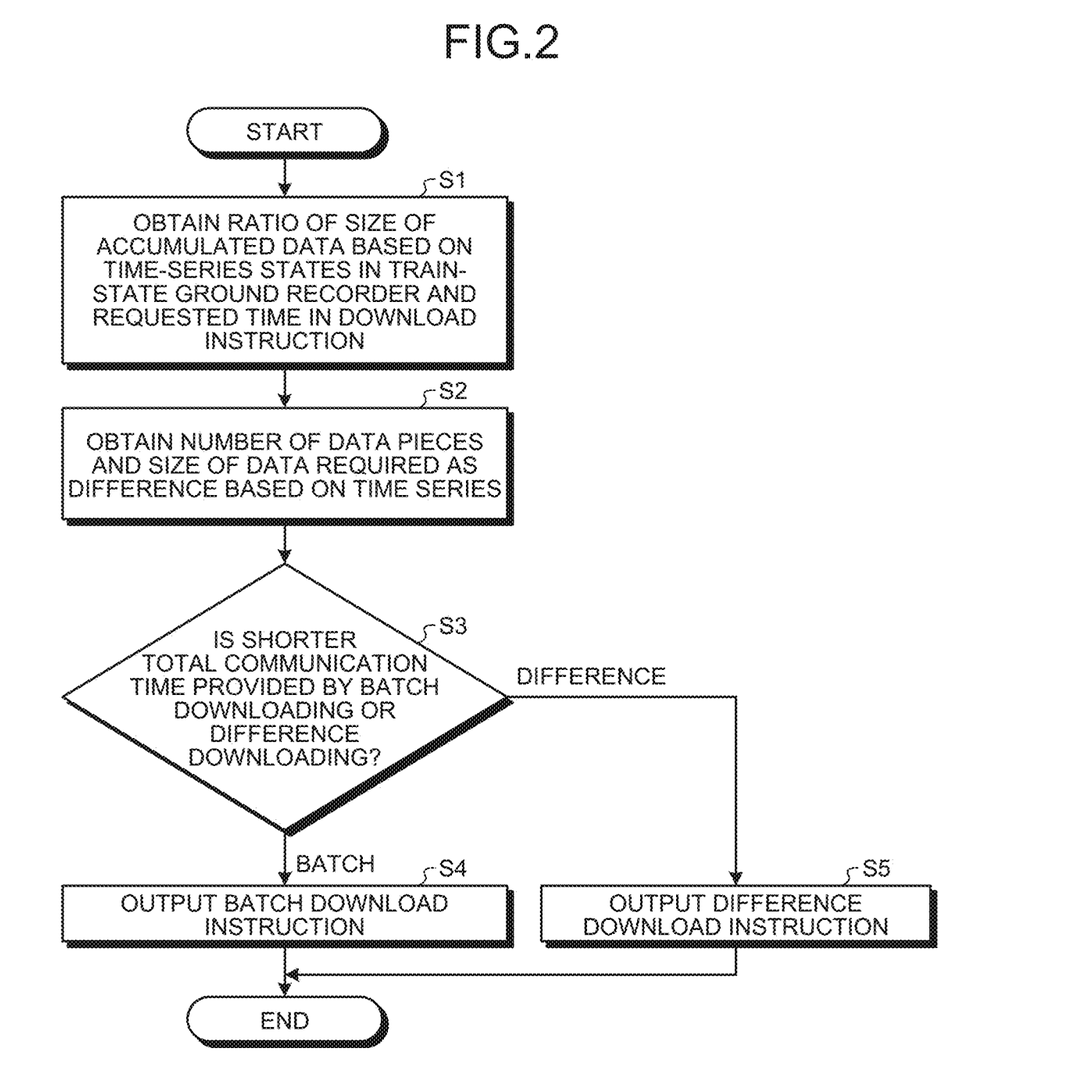
FIG. 2 is a flowchart illustrating an operation example of a difference-communication determiner illustrated in FIG. 1.

FIG. 2 is a flowchart illustrating an operation example of the difference-communication determiner 23 illustrated in FIG. 1. The communication-time evaluator 231: starts processing based on a request from a download instructing device; obtains a ratio of the size of data that has been already accumulated from time-series states in the train-state ground recorder 22 and a requested time in a download instruction (S1); and obtains the number of data pieces and the size of data required as a difference based on time series (S2). In this case, the ratio of already downloaded data is a ratio of data in a requested period recorded in the train-state ground recorder 22 with respect to all the data in the requested period recorded in the train-state onboard recorder 11, and is calculated by the communication-time evaluator 231 while referring to the train-state onboard recorder 11 and the train-state ground recorder 22. Next, the communication-time evaluator 231 determines which one of batch downloading and difference downloading provides a shorter total communication time based on the results of acquisition at S1 and S2 (S3). The expression (1) described later held in the communication-time evaluator 231 is used for the determination here. The result of determination at S3 is output to the communication switch 232 as total-communication-time evaluation information. When the total communication time by batch downloading is shorter than the total communication time by difference downloading (S3: batch), the communication switch 232 outputs a batch download instruction to the ground communication unit 21 (S4). When the total communication time by difference downloading is shorter than the total communication time by batch downloading (S3: difference), the communication switch 232 outputs a difference download instruction to the ground communication unit 21 (S5), and ends the process. The ground communication unit 21 performs a downloading process based on the instruction at S4 or S5. The requested period is a period set by an operator with the download instructing device 30 and is a period of data to be acquired on the ground side.

Figure 3:
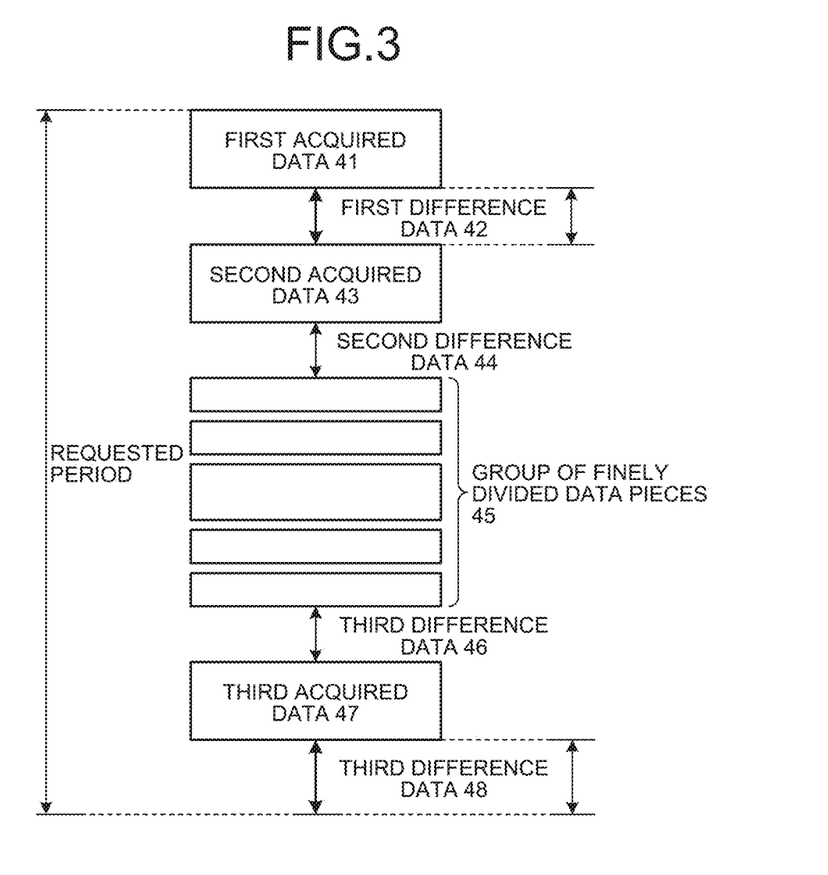
FIG. 3 is a diagram illustrating a concept in a case where the number of divisions is large, that is, batch downloading should be performed.
Figure 4:
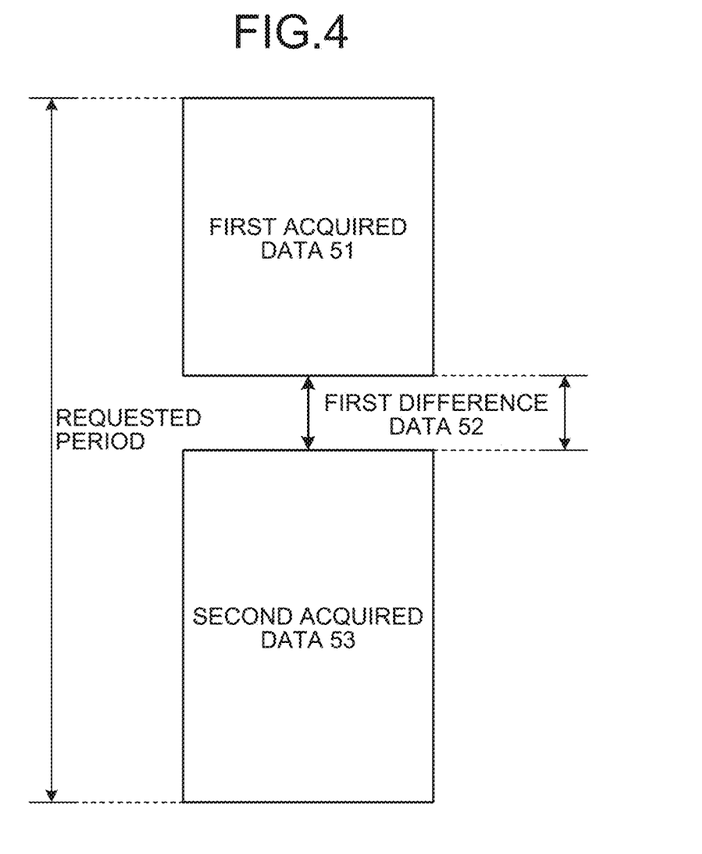
FIG. 4 is a diagram illustrating a concept in a case where the number of divisions is small, that is, difference downloading should be performed.

FIG. 3 is a diagram illustrating a concept in a case where the number of divisions is large, that is, batch downloading should be performed. FIG. 4 is a diagram illustrating a concept in a case where the number of divisions is small, that is, difference downloading should be performed. That is, FIG. 3 exemplifies a case where the procedure branches to S4 in determination at S3 in FIG. 2, and FIG. 4 exemplifies a case where the procedure branches to S5 in determination at S3 in FIG. 2.

In FIG. 3, in time series, first acquired data 41, first difference data 42, second acquired data 43, second difference data 44, a group of finely divided data pieces 45, third difference data 46, third acquired data 47, and third difference data 48 are illustrated. Although not illustrated in FIG. 3, the group of finely divided data pieces 45 includes plural pieces of acquired data and plural pieces of difference data. Because the number of divisions of data is large in FIG. 3, it takes a long time in a case of difference downloading, and the total communication time can be reduced more by batch downloading than by difference downloading.

FIG. 4 illustrates a time range of first acquired data 51, first difference data 52, and second acquired data 53 in time series. Because the number of divisions of data is small in FIG. 4, the time required for difference downloading is short, and the total communication time can be reduced more by difference downloading than by batch downloading.

A total communication time is described here using a model. A total communication time T [seconds] is represented by the following expression (1) by using: a time coefficient "a" [seconds] when the communication-time evaluator 231 reads already recorded data from the train-state ground recorder 22 in the time series for comparison based on a requested time in a download instruction; an overhead time "b" [seconds] in communication from the onboard communication unit 12 to the ground communication unit 21; a time coefficient "c" [seconds] when communication is performed; a ratio "x" [%] of already downloaded data to all data to be acquired; and a number "y" [pieces] of divided data. This expression (1) is held in the communication-time evaluator 231 as described above, and an approximate expression thereof is obtained from a graph created from the result of evaluation of actual communication data. The overhead time is the number of data pieces required for communication or the number of times for performing communication, and can be obtained by an approximate expression obtained from a graph created from the result of evaluation of actual communication data.

[Expression 1]

$$T = a \times y + c \times (1-x) + b \times y = (a+b) \times y + c \times (1-x) \qquad (1)$$

Here, a=0.3, b=6.0, and c=60.0 that are values estimated by simulation are used. Note that the present invention is not limited to these values.

Figure 5:
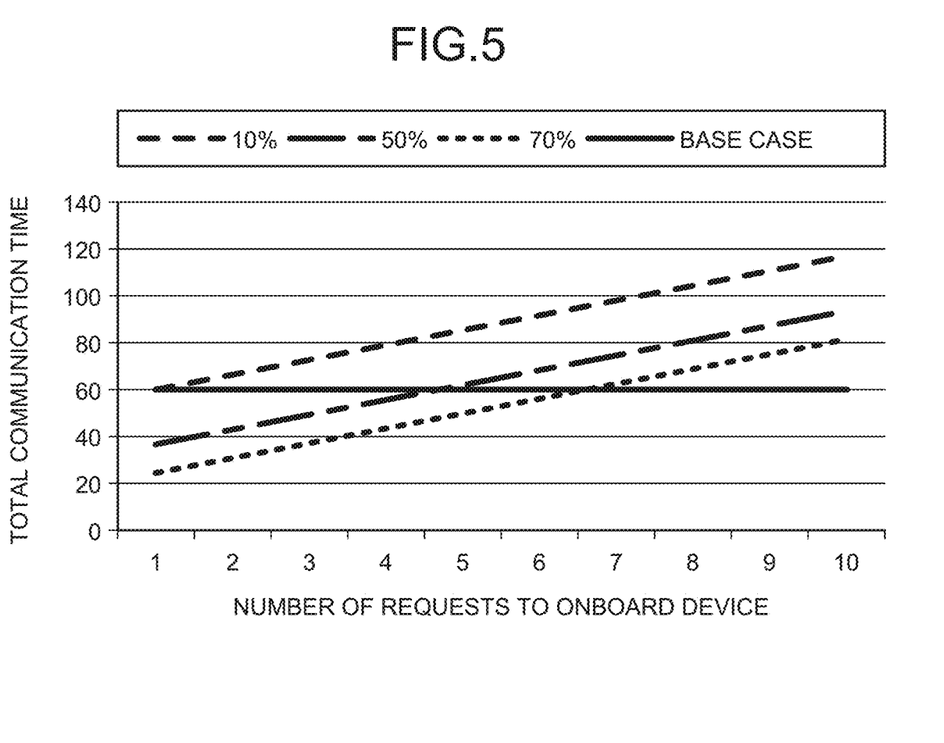
FIG. 5 is a graph illustrating a total communication time with respect to a number y of requested data pieces to an onboard device in a case of downloading difference data.

FIG. 5 is a graph illustrating a total communication time with respect to the number of requests to an onboard device in a case of downloading difference data. FIG. 5 illustrates cases where x=10[%], x=50[%], and x=70[%] calculated by the above expression (1) and a case where all data to be acquired has not been acquired yet. In the case where all data to be acquired has not been acquired yet, x=0[%] and y=0, and this case is described as a base case. Except for the base case, that is, if there are some already acquired data, in a case where a plurality of requests are received, the downloading time becomes longer with increase of the number of requests. The reason is as follows. As for each request, an overhead in an onboard device occurs in handshake for communication, and therefore the downloading time becomes longer by a time corresponding to the overhead with increase of the number of requests.

In the above expression (1), when x=10[%], T=60.3 for y=1 and T=117 for y=10. When x=50[%], T=36.3 for y=1 and T=93 for y=10. Further, when x=70[%], T=24.3 for y=1 and T=81 for y=10. In the base case where x=0[%] and y=0, T=60.

Note that T is 60.3 when x=10 and y=1 and T is 60 when x=0 and y=0. When a ratio of the amount of already received data is equal to or less than 10%, batch downloading is faster irrespective of the value of the number y of data pieces. Further, in a case where the number of divisions of already received data is large, batch downloading may be faster irrespective of the amount of already received data and the overhead time. Processing for data transfer is required before and after each communication when the number of requests is increased, and this processing becomes an overhead and makes the processing time longer with increase of the number of times. This becomes a rate limit, and thus batch downloading becomes faster.

Accordingly, as illustrated in FIG. 5, in a case where the ratio of the amount of data already acquired on the ground side is relatively small and the number of divisions of data is relatively large, the total communication time can be reduced more by batch downloading. In a case where the ratio of the amount of data already acquired on the ground side is relatively large and the number of divisions of data is relatively small, the total communication time can be reduced more by difference downloading.

This is because the ground device according to the present embodiment evaluates a total communication time for a requested time by taking an overhead time of examinations of the distributed state of existing data and an overhead time of ground-vehicle communication into consideration. Although in conventional techniques, it is determined whether to perform difference downloading or batch downloading based on only the data amount, the ground device according to the present embodiment: considers the overhead time of ground-vehicle communication; compares a communication time in a case of difference downloading and a communication time in a case of batch downloading with each other based on the ratio of the amount of already acquired data and the number of divisions; and selects a download method in which a shorter communication time is provided. Therefore, the ground device can receive train information in a shorter time than those in conventional techniques.

Figure 6:
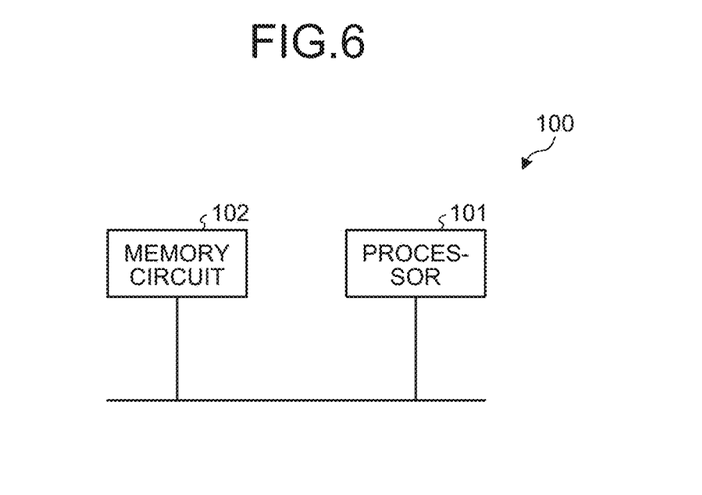
FIG. 6 is a diagram illustrating a general configuration example of hardware that implements the difference-communication determiner illustrated in FIG. 1.

FIG. 6 is a diagram illustrating a general configuration example of hardware that implements the difference-communication determiner 23 illustrated in FIG. 1. Hardware 100 illustrated in FIG. 6 includes a processor 101 and a memory circuit 102 that are connected to a bus. The processor 101 performs calculation and control by software, using data received from the bus, thereby implementing the communication-time evaluator 231 and the communication switch 232. The memory circuit 102 stores therein data and software that are necessary when the processor 101 performs calculation and control.

As described in the present embodiment, when communicating with an onboard device for acquiring time-series recorded data based on a requested time, there is employed a communication method, on a ground device side, that determines, based on transmitted data from a transmitting side and already received data on a receiving side, whether to receive the transmitted data in a batch manner or to receive a difference between the transmitted data and the already received data from a total communication time. With this configuration, a total communication time of data from the onboard device to the ground device can be reduced. Accordingly, it is possible to receive train information on the ground device side in a shorter time than those in conventional techniques, so that it is possible to monitor a train state smoothly.

According to the present embodiment, evaluation of a total communication time is performed on the ground device side, which is a data requesting side. Therefore, the load on a data providing device on a vehicle side can be reduced.

The configurations described in the above embodiment are only examples of the content of the present invention. The configurations can be combined with other well-known techniques, and part of each of the configurations can be omitted or modified without departing from the scope of the present invention.

REFERENCE SIGNS LIST 1 train, 10 onboard device, 11 train-state onboard recorder, 12 onboard communication unit, 13a, 13n onboard device, 13i plurality of onboard devices, 20 ground device, 21 ground communication unit, 22 train-state ground recorder, 23 difference-communication determiner, 231 communication-time evaluator, 232 communication switch, 30 download instructing device, 40 ground-onboard communication system, 41 first acquired data, 42 first difference data, 43 second acquired data, second difference data, 45 group of finely divided data pieces, 46 third difference data, 47 third acquired data, 48 third difference data, 51 first acquired data, first difference data, 53 second acquired data, 100 hardware, 101 processor, 102 memory circuit.

The invention claimed is:

1. A ground device capable of communicating with an onboard device and acquiring unreceived data from the onboard device by difference downloading or batch downloading, the ground device comprising
 a difference-communication determiner to determine whether:
   to acquire the unreceived data from the onboard device by difference downloading; or to acquire all data to be acquired from the onboard device including the unreceived data by batch downloading, wherein the difference-communication determiner includes:

a communication-time evaluator to evaluate a total communication time when data in a specified period is acquired by the batch downloading and a total communication time when data in the specified time period is acquired by the difference downloading, based on:

an overhead time for communication between the onboard device and the ground device;

a ratio of an amount of already received data in the ground device; and a number of the already received data pieces based on time-series; and a communication switch to output a download instruction based on a result of evaluation by the communication-time evaluator.

2. The ground device according to claim 1, wherein the communication switch outputs, based on a result of evaluation by the communication-time evaluator, a download instruction for causing the batch downloading to be performed when the total communication time by the batch downloading is shorter than the total communication time by the difference downloading, and outputs a download instruction for causing the difference downloading to be performed when the total communication time by the difference downloading is shorter than the total communication time by the batch downloading.

3. The ground device according to claim 2, wherein the communication-time evaluator evaluates the total communication time by the difference downloading as being longer, as a ratio of an amount of already received data in the ground device is smaller, or number of divisions of already received data is larger.

4. A ground-onboard communication system comprising the ground device according to claim 3, and the onboard device, wherein the onboard device receives the download instruction from the ground device and, based on the download instruction, transmits all data in the specified period in a batch manner to the ground device, or transmits only difference data of the data in the specified period to the ground device, wherein the difference data is the unreceived data.

5. A ground-onboard communication system comprising the ground device according to claim 2, and the onboard device, wherein the onboard device receives the download instruction from the ground device and, based on the download instruction, transmits all data in the specified period in a batch manner to the ground device, or transmits only difference data of the data in the specified period to the ground device, wherein the difference data is the unreceived data.

6. The ground device according to claim 1, wherein the communication-time evaluator evaluates the total communication time by the difference downloading as being longer, as a ratio of an amount of already received data in the ground device is smaller, or number of divisions of already received data is larger.

7. A ground-onboard communication system comprising the ground device according to claim 6, and the onboard device, wherein the onboard device receives the download instruction from the ground device and, based on the download instruction, transmits all data in the specified period in a batch manner to the ground device, or transmits only difference data of the data in the specified period to the ground device, wherein the difference data is the unreceived data.

8. A ground-onboard communication system comprising the ground device according to claim 1 and the onboard device, wherein the onboard device receives the download instruction from the ground device and, based on the download instruction, transmits all data in the specified period in a batch manner to the ground device, or transmits only difference data of the data in the specified period to the ground device, wherein the difference data is the unreceived data.

* * * * *